United States Patent [19]
Matsuoka et al.

[11] 3,971,550
[45] July 27, 1976

[54] EYE-BUSH

[75] Inventors: Chikara Matsuoka; Yuichi Amano, both of Aichi, Japan

[73] Assignee: Toyota Jidosha Kogyo Kabushiki Kaisha, Japan

[22] Filed: Jan. 21, 1975

[21] Appl. No.: 542,752

[30] Foreign Application Priority Data
Jan. 25, 1974 Japan................................ 49-10665

[52] U.S. Cl............................. 267/57.1 R; 267/63 R
[51] Int. Cl.²............................................ F16F 7/12
[58] Field of Search................ 267/57.1 R, 57.1 A, 267/63 R, 63 A, 54, 57; 308/238

[56] References Cited
UNITED STATES PATENTS
2,066,187  12/1936  Piron ................................ 267/63 A
3,042,394  7/1962  Bliss................................... 267/54 A FOREIGN PATENTS OR APPLICATIONS
160,238  12/1954  Australia........................... 267/54 A Primary Examiner—James B. Marbert
Attorney, Agent, or Firm—Elliott I. Pollock

[57] ABSTRACT

An elastic eye-bush is provided for use in combination with the eyeend of an automobile leaf spring, etc. for absorption of radially applied shock loads. The bush has its intermediate portion diametrically reduced so as to provide a space between the eyeend and the intermediate portion, which portion is made up of co-centrically stratified layers of different hardness. The eye-bush offers an improved damping characteristic exhibiting a low spring constant under smaller loads and a high one under larger loads.

4 Claims, 7 Drawing Figures

EYE-BUSH

BACKGROUND OF THE INVENTION

This invention generally relates to an improved damper bush for radial shock absorption, and more specifically to an improved eye-bush for preferable use with an automobile multileaf spring which may offer an optimum spring characteristic under a wide range of shock loads radially applied thereto.

Generally, it has hitherto been difficult to provide a shock load or energy absorber of the type which has a satisfactory characteristic capable of absorbing impulsive energies effectively over a wide load range. To describe it in more details with reference to an eye-bush for use with an automobile multileaf spring, the problem lies in that for the purpose of merely eliminating or absorbing unobjectionable fine vibrations occurring under comparatively small load conditions, the damping eye-bush need only exhibit a comparatively low spring constant; but such a low spring constant of the eye-bush will result in a greater radial deflection of the bush under larger load conditions, thus causing problems of deteriorating its strength. On the contrary, if the eye-bush is given a higher spring constant, then the result will be that under smaller loads rather violent transmission of fine vibrations will occur and cause discomfort to a passenger aboard the vehicle where the eye-bush is mounted.

The present invention solves such prior art problems of the damper eye-bush relating to vibrations, durabilities, wheel-alignment variations, etc. by providing a novel eye-bush construction having a spring characteristic which within a range of smaller loads exhibits a lower rate of spring constant while exhibiting a higher rate of spring constant within a range of larger loads.

SUMMARY OF THE INVENTION

The present applicant earlier disclosed in its Japanese Utility Model Application No. 94657/73 an eye-bush for use with automobile leaf springs which featured a low spring constant under smaller loads and a high one under larger loads.

This invention has as its object to provide a further improved eye-bush of the aforementioned type having a more satisfactory characteristic of load-deflection relationship and improved durabilities as well.

To accomplish the above object, an eye-bush according to the present invention comprises an elastic bushing which is adapted to be laterally firmly clamped in and by a holding bracket secured to a chassis frame of an automobile, while being press fitted in an eye-opening formed at the end of an automobile leaf spring, etc. The axially intermediate portion of said elastic bushing has an outer diameter smaller than the inner diameter of the spring eyeend while said intermediate portion is made up of stratified annular layers of elastic materials having different elasticities or hardness from each other.

Preferably, the inner annular layer of the intermediate portion of the elastic bushing is conveniently made of a hard material such as resin or metal while the outer annular layer of said intermediate portion is made of the same rubber-like material as the major portion of the bushing. It is to be noted that the elastic eye-bush of the invention is in no way limited in its application only to automobile leaf springs as described, but may also equally be used for shock absorption purposes in combination with eyeend like parts of any other machinery which are subjected to radially directed shock loads or forces.

Further, the eye-bush according to the invention may conveniently be constructed so as to be crosswise divisible into two halves.

The invention will now be described with reference to the accompanying drawings.

DESCRIPTION OF THE PRESENTLY PREFERRED EMBODIMENT

Figure 1:
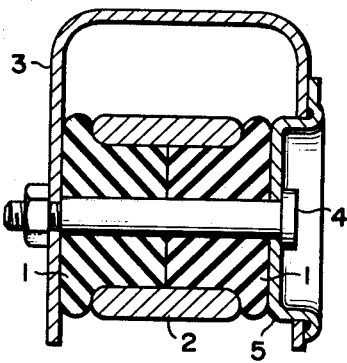
FIG. 1 is a longitudinal section of the conventional eye-bush as connecting the eyeend of an automobile leaf spring to the chassis frame.
Figure 2:
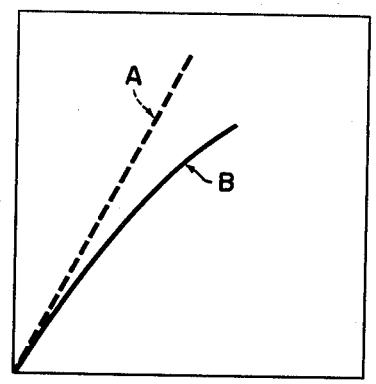
FIG. 2 is a graphic representation of the spring characteristics of the conventional eye-bush.

As shown in FIG. 1, the ordinary eye-bush 1 in common use for automobiles, etc. is firmly fit in an eye shaped spring end 2 of a load carrying member such as an automobile leaf spring and laterally clamped in a holding bracket 3 by means of a fastening bolt 4. With this conventional structure of eye-bush, however, it has been known that the load-deflection characteristic obtainable is represented by either a linear curve A or a curve similar to B (FIG. 2). This almost invariable rate of spring exhibited by the eye-bush over the entire range of loads has very often proved to be a major cause of discomfort to a driver or passenger aboard a vehicle where the eye-bush is mounted. It is for this reason that there has been a desire in the art for the provision of an eye-bush of the type whose spring characteristic is such that in the range of smaller loads its spring constant is kept low while being high in the range of larger loads.

Figure 3:
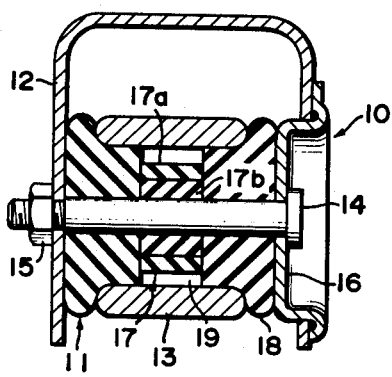
FIG. 3 is a longitudinal section of an eye-bush according to the invention.

In FIG. 3, is shown an eye-bush 10 of the invention as assembled with an automobile leaf spring. Reference numeral 11 indicates an elastic bushing having a certain elasticity as a whole and substantially of the cylindrical shape. The elastic bushing 11, as shown, is tightly sandwiched in and by a holding bracket 12 of U-shaped section, and is secured in position by a fastening bolt 14 with a nut 15, while being press fit in an eye 13 formed at the end of a leaf spring. Conveniently, the bracket 12 includes a detachable part 16 to facilitate assembling or disassembling the elastic eye-bush 10.

Figure 4:
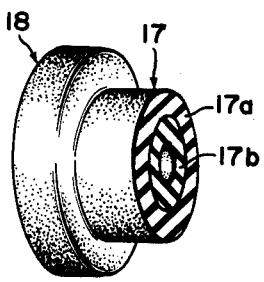
FIG. 4 is a perspective view of a cut part of the elastic eye-bush according to the invention.

The cylindrical shaped bushing 11 has its axially intermediate portion 17 diametrically reduced as compared with both major portions 18. In other words, the outer diameter of intermediate portion 17 is smaller than the inner diameter of the eye 13. Hence, it is designed that when the elastic eye-bush is mounted, there is to be provided an annular space 19 of a certain width between the eye 13 and the periphery of the intermediate portion 17. As best shown in FIG. 4, which perspectively illustrates a cut part of the bush, the intermediate portion 17 of reduced diameter is made up of cocentrically stratified annular layers of elastic materials having different elasticities or hardness from each other, such for example as an inner annular layer 17b of resin-like hard elastic material, etc., and an outer annular layer 17a of rubber-like soft elastic material, etc. The outer layer 17a may be of the same material as the main portion 18 of the bush.

In operation, the eye-bush 10 laterally bound by the bracket 12 will be subjected to radial dynamic forces from the spring eye 13 of the leaf spring being loaded through the wheel axle. As long as such loads acting upon the leaf spring remain small enough to keep the intermediate portion 17 spaced apart from the eye 13, almost all of forces or shock loads through the spring eye are taken up by the enlarged portion 18 of the bushing. However, when such loads become greater for some reason or other so that the extent of the radial deflection of the portion 18 exceeds the width of the space 19, the intermediate portion 17 of reduced diameter will act along with the portions 18 in absorbing those shock loads or forces. Because of the fact that the mass of the outer layer 17a is restricted of its free elastic deformation laterally by the bracket 12 and radially by the inner layer 17b whose hardness is greater than that of the outer layer, the intermediate portion 17 as a whole will show a higher rate of spring constant in the radial direction so that a radial deflection of the eye-bush 10 is restricted to a great extent. In this case, the soft portion 17a serves to reduce the impact shock added to the bushing. It is of course noted that the rate of spring constant in the radial direction thus produced by the intermediate portion 17 can be freely selected by varying the rubber hardness or the outer layer width.

Figure 5:
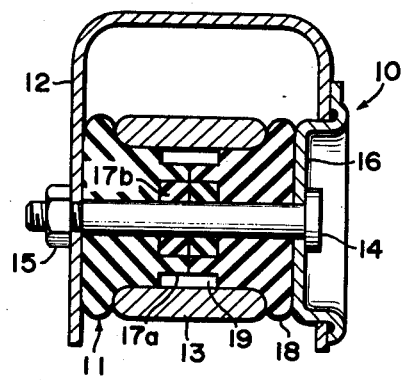
FIG. 5 is a longitudinal section of a modified embodiment of the invention.

FIG. 5 shows an alternative embodiment of the invention, wherein the eye-bush 10 is made up of two equal halves with the outer layers 17b formed integral with the diametrically larger portions 18.

The technical conception of the invention will now be described with reference to FIGS. 6 and 7 which are graphic and diagrammatic representations of how the spring system of the invention works. When a load W is applied to the elastic eye-bush comprising diametrically larger portions 18 of a spring constant $K_1$ and an intermediate portion of a spring constant $K_2$, the resultant spring constant K of the whole spring system is, as long as the clearance 19 exists between the eye 13 and the intermediate portion 17:

$$K = K_1 + K_1 = 2K_1$$

Within this load range, the load-deflection relation is given as:

$$W_1 = 2K_1\delta \qquad \qquad 1.$$

($\delta$ represents deflection)

As the load increases to an extent such that the clearance 19 is eliminated and the intermediate portion 17 commences deflection, the spring constant $K'$ then exhibited by the system is:

$$K' = 2K_1 + K_2$$

Within the range of the increased loads $W_2$, therefore, the load-deflection relation is given as:

$$W_2 = K'\delta = 2K_1\delta + K_2(\delta - t). \qquad (2).$$

($t$ is clearance size)

Figure 6:
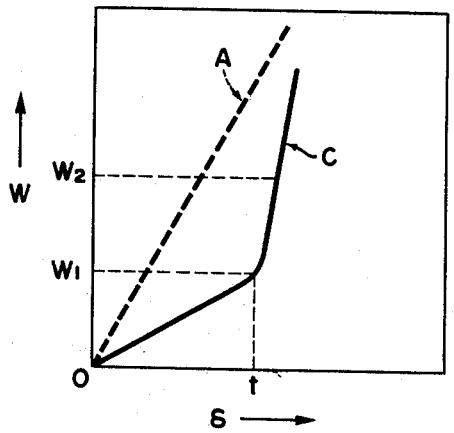
FIG. 6 is a graphic representation of spring characteristics of the eye-bush according to the invention.
Figure 7:
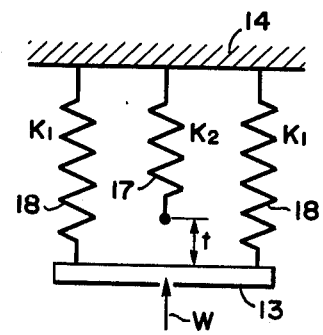
FIG. 7 is a diagrammatic representation of a model spring system according to the invention.

Considering (1) and (2), therefore, the eye-bush of the invention will provide a spring characteristic shown as a curve C in FIG. 6, which exhibits greater extents of deflection within the range of smaller loads. This assures a satisfactory effect of absorbing fine vibrations under smaller loads transmitted from vehicle wheels.

Further, it is assured that within the range of larger loads, all loads on the eye-bush are shared also by the intermediate portion to thereby limit the extent of deflection, so that the transmissibility of fine vibrations is lowered and the eye-bush is distinctly improved of its durability as compared with the conventional structure.

Still further, the eye-bush of the invention is useful in maintaining the rate of wheel-alignment within a least possible variation for improvement of vehicle steerabilities and stabilities.

It is to be understood that the invention is in no way limited of its application only to the automobile leaf spring but also may equally be applicable to any other object where radial shock loads or forces are applied, and various modifications and additions in the practice of the invention are possible within the scope of the appended claims.

We claim:

1. An eye-bush for use with a load carrying member for absorption of radial loads applied thereon, comprising a cylindrical elastic bushing which is adapted to fit elastically within a hollow cylindrical eye portion formed on the load carrying member while being laterally firmly clamped in and by portions of a holding bracket disposed adjacent the opposite ends of said eye portion, said cylindrical bushing having a pair of axial outer cylindrical portions which engage said holding bracket portions respectively and which are spaced from one another by a coaxial intermediate cylindrical bushing portion having a diameter less than that of said outer portions, said intermediate portion of said elastic bushing comprising a plurality of stratified annular layers of different elastic materials disposed in superposed coaxial relation to one another about the axis of said bushing and comprising an inner annular layer and an outer annular layer, said inner annular layer being fabricated of a material having a greater hardness than the material of said outer annular layer, the outer annular layer of said intermediate portion having an outer diameter which is smaller than the inner diameter of the eye portion of the load carrying member to define a gap between the inner surface of said eye portion of said load carrying member and the outer surface of said outer annular layer.

2. An eye-bush according to claim 1 wherein the outer annular layer of said intermediate portion is integral with the diametrically larger outer cylindrical portions of the bushing.

3. An eye-bush according to claim 1, wherein the inner annular layer is made of a resin-like material and the outer annular layer is made of a rubber-like material.

4. An eye-bush according to any claim 1 wherein said elastic bushing is made up of two halves divisible along a central plane extending perpendicular to the axis of the bushing.

* * * * *